United States Patent [19]

Podlipnik

[11] Patent Number: 4,919,196

[45] Date of Patent: Apr. 24, 1990

[54] THREE-STAGE MERCURY SWITCH FOR OPERATION BETWEEN THE HEATING AND COOLING MODE

[76] Inventor: Kalman Podlipnik, 7911 Kennedy Blvd., North Bergen, N.J. 07047

[21] Appl. No.: 276,652

[22] Filed: Nov. 28, 1988

[51] Int. Cl.$^5$ .................... G05D 23/08; F25B 29/00
[52] U.S. Cl. ............................ 165/26; 165/27; 236/1 C; 236/78 A; 337/331; 337/373; 337/374
[58] Field of Search ............... 165/26, 27; 236/1 C, 236/78 A; 337/373, 374, 375, 111, 331

[56] References Cited

U.S. PATENT DOCUMENTS

| | | | |
|---|---|---|---|
| 1,881,950 | 10/1932 | Rayfield | 337/373 |
| 1,960,856 | 5/1934 | Stacey | 337/331 |
| 2,969,916 | 1/1961 | Shequen | 165/26 |
| 3,014,704 | 12/1961 | Bierwirth et al. | 165/26 |
| 3,975,703 | 8/1976 | Andresen, Jr. | 337/374 |
| 3,993,120 | 11/1976 | Iberg et al. | 165/26 |
| 4,536,727 | 8/1985 | Romano | 165/26 |
| 4,687,050 | 8/1987 | Podlipnik | 165/27 |
| 4,775,099 | 10/1988 | Podlipnik | 165/26 |

Primary Examiner—John Ford
Attorney, Agent, or Firm—Arthur L. Plevy

[57] ABSTRACT

There is disclosed a thermostat controlled apparatus which controls the operation of a heating system and a cooling system in response to temperature variations in a given environment. The thermostat has a three-electrode mercury switch which is coupled to a single bimetallic element which rotates the switch in response to temperature variations. The switch has a housing containing a pool of mercury and three electrodes extending within. A common electrode is connected to a voltage source. A second electrode is connected to the cooling system. A third electrode is connected to the heating system. Tilting the switch clockwise causes the mercury to connect the second and common electrodes, thereby energizing the cooling system; tilting the switch counterclockwise causes the mercury to connect the third electrode and common electrode, thereby energizing the heating system. In this manner, the single switch automatically controls both the heating and cooling operations, thereby maintaining the desired temperature within a given range. The range is determined by the configuration of the housing.

15 Claims, 1 Drawing Sheet

THREE-STAGE MERCURY SWITCH FOR OPERATION BETWEEN THE HEATING AND COOLING MODE

BACKGROUND OF THE INVENTION

This invention relates to thermostatically controlled apparatus and more particularly to such apparatus for controlling the automatic operation of a heating system and a cooling system in response to the temperature of a monitored environment.

Essentially, there are many facilities which can utilize both air conditioning and heating units for all seasons. Such units may be wall mounted, floor mounted or window mounted. Even though such units may have their own thermostat controls, it would be desirable to control all such units from a single thermostat unit.

For examples of thermostatically controlled outlets which relate to the separate control of heating and air conditioning systems, reference is made to U.S. Pat. No. 4,687,050 issued to Kalman Podlipnik, the inventor herein, on Aug. 18, 1987 and entitled "Dual Thermostat Controlled Outlets". In that system there is shown a housing which contains two thermostats interwired so as to enable one thermostat to control the heating operation and the other thermostat to control a cooling operation. As seen in that patent, a housing contains AC power receptacles which are coupled, respectively, to the thermostats to enable a separate heating system to be activated when needed and to enable an air conditioning unit or a fan to be activated during intervals when heating is not required.

Also see U.S. Pat. No. 4,775,099 also issued to Kalman Podlipnik on Oct. 4, 1988 and entitled "Thermostatic Control Apparatus for Operation Between the Heating and Cooling Mode." To control the heating and cooling operations, this system utilizes a pair of mercury switches. The two mercury switches are coupled to a single bimetallic element and are inclined, one with respect to the other. The circuit configuration is such that one switch controls the heating operation while the other switch controls a cooling operation. Heating and cooling occurs within a predetermined range which is adjustable by means of the angular positions of the switches with respect to the bimetallic coil.

Therefore, it is a main object of the present invention to provide an improved thermostatic control apparatus for maintaining the environment at a desired temperature within a given temperature range by automatically controlling a heating system and a cooling system.

A further object of the present invention is to utilize a single mercury switch for maintaining the environment within a given temperature range of the desired temperature, the temperature being a function of the angular position of the mercury switch and the range being purely a function of the configuration of the switch housing.

SUMMARY OF THE PRESENT INVENTION

In accordance with the teachings of the present invention, a three-stage mercury switch for operation between the heating and cooling modes is disclosed herein, wherein the thermostatic control apparatus automatically controls the heating and cooling operations with one mercury switch. A three-electrode mercury switch is connected to a single bimetallic element. The switch has a housing containing a pool of mercury. Three electrodes extend into the housing: the common electrode connecting to a source of operating potential, a first electrode connecting to a heating system and a second electrode connecting to a cooling system. There are three arcuate pockets located within the housing: the first pocket is positioned in the middle of the housing, the second pocket is at the near end and the third pocket is at the far end. The common electrode extends across all three pockets. The first electrode extends to the second pockets. When mercury flows into the second pocket, the first and common electrodes are connected. The second electrode extends across the three pockets but only the tip is exposed over the third pocket. When mercury flows into the third pocket, the second and common electrodes are connected. When the temperature falls below the desired temperature, the coil contracts causing the housing to tilt and the mercury to flow from the first pocket to the third pocket, thereby energizing the heating system. When the temperature rises above the desired temperature, the coil expands causing the housing to tilt in the other direction and the mercury to flow from the first pocket to the second pocket, thereby energizing the cooling system. As will be explained, the lower elevation of the first pocket inhibits the flow of mercury into either the second and third pockets unless the switch is tilted beyond a pre-determined range. In this manner, the thermostat is adapted to control the operation of the heating system and the cooling system while providing automatic changeover between heating and cooling.

DETAILED DESCRIPTION OF THE INVENTION

Figure 1:
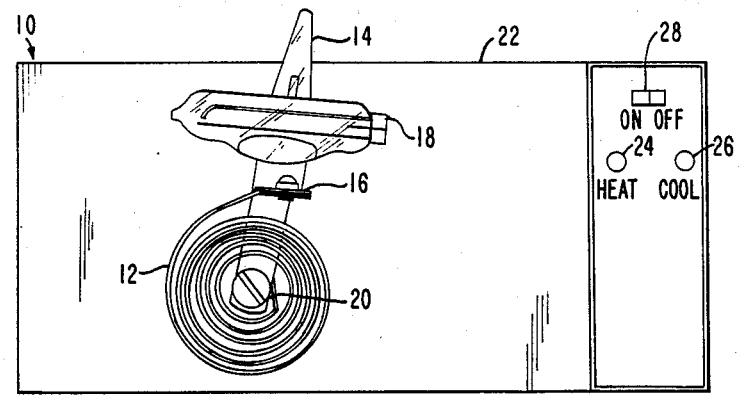
FIG. 1 is a schematic diagram depicting the thermostat control system employing a unique three-electrode mercury switch according to this invention.

Referring to FIG. 1 there is shown a simple schematic diagram of a thermostat control apparatus 10 according to this invention. The thermostat control apparatus 10 operates a heating system in one mode and a cooling system in a second mode in order to maintain the environment at a desired temperature within a given temperature differential. As seen in FIG. 1, there is shown a temperature-responsive bimetallic coil 12 that provides a mechanical displacement according to changes in the temperature of said environment. The coil 12 is associated with a movable indexing arm 14. The function of the indexing arm is to move the coil 12 by a predetermined amount according to a desired temperature setting. Mounted to the end of the bimetallic coil 12 is a planar plate 16. A mercury switch 18 is mounted to the plate 16 bimetallic coil 12 by the planar. The indexing arm 14 is secured to the coil 12 by means of a conventional screw adjustment or holding mechanism 20. AS the indexing arm 14 is moved, the coil 12 expands or compresses thus changing the position of the mercury switch 18. For the sake of general purposes, the entire mechanism is enclosed within a typical housing designated by reference numeral 22. The housing has positioned thereon a heating lamp, designated as 24, which illuminates when the thermostat 10 is in a heating mode, and a cooling lamp 26 which illuminates when the thermostat 10 is in the cooling mode. An on/off switch 28 allows for the thermostat 10 to be deactivated.

Figure 2:
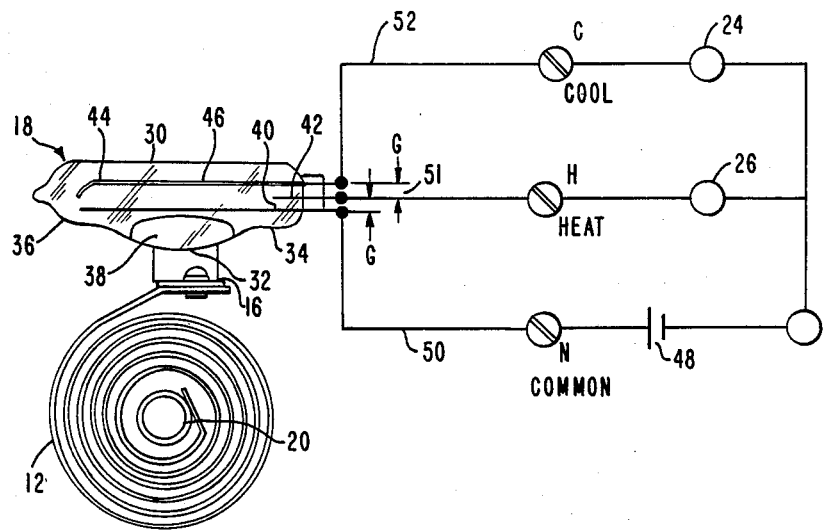
FIG. 2 is a detailed diagram of the three-electrode mercury switch shown in FIG. 1.

Referring to FIG. 2 there is shown a detailed schematic diagram of the mercury switch 18. The same reference numerals used in FIG. 1 have been retained for corresponding parts. Thus, as seen in FIG. 2 and FIG. 1, the mercury switch 18 is coupled to the bimetallic element 12 via the plate 16. The mercury switch 18 has a tubular glass housing 30 which has three arcuate pockets 32, 34, 36 at the bottom. The first arcuate pocket 32 is formed at the middle of the base. The second arcuate pocket 34 is formed at the far end of the housing 30; the third arcuate pocket 36 is formed at the near end of the housing 30. The second and third pocket 34, 36 are at a higher elevation than the first pocket 32. A pool of mercury 38 is contained within the housing 30. The significance of the difference elevations will be explained in connection with the movement of the mercury 38. A common electrode 40 extends along the longitudinal axis of the housing 30 thereof and across all three pockets 32, 34, 36. A wire 50 is connected to the common contact 40 and to a common terminal (N). A first electrode 42 is positioned above the common electrode 40 at a distance G therefrom. A wire 51 is connected to contact 42 and to a terminal (H) or heating terminal. The tip of the first electrode 42 extends over the second pocket 34. A second electrode 44 is positioned above the first electrode 42 and extends over the first and second pockets 32, 34 to the third pocket 36. The tip of the second electrode 44 is exposed and curved downward towards the third pocket 36 at a distance G from the common electrode 40. The remainder of the second electrode 44 is protected by an insulator sleeve 46. The electrode 44 is connected via a wire 52 to a terminal (C) or cooling terminal.

As seen in FIG. 2, there is a source of potential 48, which may be a 24 volt transformer. The negative terminal of the transformer is connected to input terminal 1 which connects to the two indicator lamps 24, 26 (FIG. 2). The green indicator lamp 26 is indicative of the thermostat 10 operating in the cooling mode, and the red lamp 24 is indicative of the thermostat 10 operating in the heating mode. The red lamp 24 is connected to the terminal designated by the letter H; the green lamp 26 is connected to the terminal designated by the letter C.

The common terminal N connected to the source of potential 48 is also connected to the common electrode 40. The first electrode 42 is connected to terminal H and to the red indicator lamp 26. The second electrode 44 is connected to terminal C and to the red indicator lamp 24. It is of course understood that by connecting a power relay between terminal H and terminal 1, the heating system can be energized. Similarly, by connecting a power relay between terminal C and terminal 1, the cooling system can be energized. As seen from the position of the mercury switch 18 in FIG. 2, the lamps 24 and 26 are not in any manner energized.

As seen in FIG. 2, the switch 18 is mounted on the bimetallic element 12 such that the mercury 38 is contained entirely within the first arcuate pocket 32. For an increase in temperature, the switch tilts clockwise, causing the mercury 38 to flow into the second arcuate pocket 32; the mercury 38 connects electrodes 42 and 44, thereby energizing the cooling system and illuminating lamp 26. Similarly, for a decrease in temperature, the switch 18 tilts counterclockwise, causing the mercury 38 to flow into the third arcuate pocket 36; the mercury 38 connects electrodes 40 and 44, thereby energizing the heating system and illuminating lamp 24. It can be seen that the height of the first pocket 32 relative to the height of the second and third pockets 34, 36 provides a barrier for the mercury 38 to flow from the first pocket 32 into either the second or third arcuate pocket 34, 36. A steeper path to either pocket 34 or 36 offers greater resistance to the flow of mercury 38, thereby requiring a greater difference between the actual and desired temperatures before either the cooling or heating system can be energized. Therefore, the temperature would have to exceed the desired temperature by the temperature differential before the cooling system could be energized, or the temperature would have to fall below the desired temperature by the temperature differential before the heating system could be energized. The temperature differential, determined by the configuration of the housing 30, can be selected between one to six degrees or between six to ten degrees.

Referring to FIG. 1 again, the indexing arm 14 is set for a desired temperature. For example, if the index arm 14 is set six degrees below the desired temperature so that the switch is rotated counterclockwise, the heating unit will operate until the bimetallic coil 12 expands and rotates the switch 18 until the switch 18 becomes level. The operation is as follows. When the thermostat 10, as shown in FIG. 2, is monitoring a given temperature and the temperature falls below a desired temperature of 70° F., the heating unit is energized by the switch 18 due to a counterclockwise mechanical rotation of the bimetallic coil 12 which causes the pool of mercury 38 to flow into the third arcuate pocket 36 and connect electrodes 40 and 44. As one can see, this position thereby immediately energizes the heating lamp 24 and closes the power relay to energize the heating system'

When the temperature rises, the bimetallic coil 12 expands and the switch 18 rotates clockwise to the position shown in FIG. 2 causing the mercury 38 to return to the first pocket 32, whereby electrical contact is broken between electrodes 40 and 44 and the heating system is disabled. If the temperature continues to rise, the switch 18 is rotated further in a clockwise direction by the coil 12. In this manner the pool of mercury 38 flows into the second arcuate pocket 34 and connects electrodes 40 and 42 thus providing power to illuminate indicator lamp 26 and energize the cooling system. The cooling system remains operative until the environment reaches a temperature of one to six degrees above the desired temperature, at which time the switch 18 has rotated back to the position shown in FIG. 2 and the mercury has flowed back into the first arcuate pocket 32.

In an alternate embodiment, the switch 18 can be adapted to tilt with respect to the horizontal position thereof indicated in FIG. 2 such that the tolerance of the desired temperature is shifted. For example, the switch can be rotated clockwise such that only a 0.5 degree increase in temperature will energize the cooling system; as a result, the tolerance of the heating system will be increased by 1.5 degrees such that a counterclockwise rotation of 1.5 degrees is required before the heating system is energized. This embodiment offers tighter control of the maximum allowable temperature. It can be seen that the overall temperature differential does not change since this is solely a function of the relative heights of the arcuate pockets 32, 34 and 36.

It is also understood that one can change the sequence of operation of the switch. In the above-noted examples, the switch operates between the three electrodes to provide an On-Off-On condition. By variation of the electrodes and by changing or rotating the insulation on the electrodes which are inside the glass housing, one can change the switching combinations from the On-Off-On to On-On-On, On-On-Off, or Off-On-On. Thus, the three-stage switch can operate in the above modes. In this manner, the switch can be used for dual heating as to control two heating systems, dual cooling as to control two cooling systems or to switch a two-stage heating and cooling operation as for example existing in a heat-pump system.

Although the instant invention has been described in connection with a highly specific exemplary embodiment thereof, it will be understood that many variations and modifications can be made by those of ordinary skill in the art. Therefore, it is manifestly intended that this invention be only limited by the claims and the equivalents thereof.

What is claimed is:

1. A thermostat control apparatus for operating a heating system and a cooling system to maintain a desired temperature of a monitored environment, comprising:
    a temperature-responsive bimetallic element operative for providing a mechanical displacement according to changes in the temperature of said environment; and
    a mercury switch coupled to said bimetallic element having a housing with at least three arcuate pockets, said at least three arcuate pockets including a first pocket formed at the middle of said housing, and second and third pockets formed at respective ends of said housing, said first, second and third pockets having different elevations relative to an upper surface of said bimetallic element when said upper surface is positioned horizontally, said first pocket having the lowest elevation, said mercury switch further including a pool of mercury contained within said housing, a common electrode connected to a source of operating potential entering said housing and extending across each of said at least three pockets, a first electrode connected to said cooling system and located in said housing extending to said heating system and located in said housing extending to said third pocket, wherein said switch is positioned relative to said bimetallic element such that at said desired temperature, said mercury is fully contained within said first pocket, whereby if the temperature of said environment rises above the desired value, said switch is tilted via said bimetallic element such that said second pocket is situated at an elevation lower than said first and third pockets in which the mercury flows into the second pocket and electrically connects said common electrode to said first electrode thereby actuating said cooling system, the cooling system remaining activated until the temperature decreases to said desired value, and whereby when said temperature drops below said desired value said switch is tilted in an opposite direction via said bimetallic element such that said third pocket is situated at an elevation lower than said first and second pockets in which said mercury flows into said third pocket and electrically connects said common electrode to said second electrode thereby actuating said heating system, the heating system remaining activated until the temperature increases to said desired value, wherein the difference in elevation between said first pocket and said second and third pockets creates a temperature differential such that said temperature must change by said differential in order for said mercury to flow into either of said second and third pockets, whereby the temperature differentials between the first-second and first-third pockets are shifted due to the difference in relative elevations of said second and third pockets, and whereby said heating and cooling systems operate to the exclusion of each other.

2. The apparatus according to claim 1 wherein said bimetallic element is a bimetallic coil.

3. The apparatus according to claim 1 further including setting means coupled to said bimetallic element and adapted to bias said bimetallic element at a given temperature indicative of the temperature to be maintained at said monitored environment.

4. The apparatus according to claim 1 wherein said first electrode extends across said first and third pockets to said second pocket, the portion of said first electrode extending thereover being surrounded by an insulator sleeve.

5. The apparatus according to claim 1 wherein said second electrode extends across said first and second pockets to said third pocket, the portion of said second electrode extending thereover being surrounded by an insulator sleeve.

6. The apparatus according to claim 1 wherein said temperature differential is 6–10 degrees.

7. The apparatus according to claim 1 wherein said temperature differential is between 1–6 degrees.

8. The apparatus according to claim 1, wherein said housing is a glass housing.

9. A thermostat control apparatus for maintaining a desired temperature of a monitored environment comprising:
    temperature-responsive means for providing a mechanical displacement from an imaginary horizontal reference line according to changes in the temperature of the environment; and
    a mercury switch coupled to said temperature-responsive means including a housing with at least three arcuate pockets having different elevations relative to said horizontal reference line when an upper surface of said bimetallic element is parallel to said horizontal reference line, said at least three arcuate pockets including a first arcuate pocket located at the center of said housing having the lowest elevation among said arcuate pockets, said mercury switch further including a common electrode connected to a source of operating potential extending into said housing and across said arcuate pockets, electrodes adapted to correspond to at least two of said at least three arcuate pockets extending into said housing and terminating at said corresponding arcuate pockets, and a pool of mercury located in said housing, said mercury being contained in said first arcuate pocket when said upper surface of said bimetallic element is horizontal relative to said horizontal reference line, said mercury flowing into the arcuate pocket having the lowest elevation relative to the horizontal reference lines when said mercury switch is displaced by said temperature responsive means, said mercury providing a conducting path between said common electrode and said electrode corresponding to said arcuate pocket having said lowest elevation, whereby the difference in relative elevations between said first arcuate pocket and each other arcuate pocket creates a temperature differential between said first pocket and said each other pocket such that the desired temperature has to differ by said temperature differential before mercury flows out of said first arcuate pocket.

10. A thermostat control apparatus according to claim 9, wherein said at least three arcuate pockets includes a first pocket centrally-located within said housing, and second and third arcuate pockets, located at opposite ends of said housing.

11. A thermostat control apparatus according to claim 10, wherein electrodes correspond to said second and third arcuate pockets, thereby forming on ON-OFF-ON switching sequence.

12. A thermostat control apparatus according to claim 11, wherein electrodes correspond to said first, second and third arcuate pockets, thereby forming an ON-ON-ON switching sequence.

13. A thermostat control apparatus according to claim 10, wherein electrodes correspond to said first and second arcuate pockets, thereby forming an ON-ON-OFF switching sequence.

14. A thermostat control apparatus according to claim 10, wherein electrodes correspond to said first and third arcuate pockets, thereby forming an OFF-ON-ON switching sequence.

15. A thermostat control apparatus according to claim 9, further including setting means adapted to bias said temperature-responsive means at a given temperature indicative of the desired temperature to be maintained at said monitored environment.

* * * * *